United States Patent
Vasseur et al.

(10) Patent No.: US 9,450,978 B2
(45) Date of Patent: Sep. 20, 2016

(54) HIERARCHICAL EVENT DETECTION IN A COMPUTER NETWORK

(71) Applicant: Cisco Technology, Inc., San Jose, CA (US)

(72) Inventors: Jean-Philippe Vasseur, Saint Martin d'Uriage (DE); Javier Cruz Mota, Assens (CH); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 14/164,460

(22) Filed: Jan. 27, 2014

(65) Prior Publication Data
US 2015/0193696 A1    Jul. 9, 2015

Related U.S. Application Data

(60) Provisional application No. 61/923,847, filed on Jan. 6, 2014.

(51) Int. Cl.
| | | |
|---|---|---|
| *G06N 3/02* | (2006.01) | |
| *H04L 29/06* | (2006.01) | |
| *G06N 99/00* | (2010.01) | |
| *H04L 12/26* | (2006.01) | |
| *H04L 12/24* | (2006.01) | |
| *H04L 12/801* | (2013.01) | |
| *H04L 12/855* | (2013.01) | |
| *H04L 12/891* | (2013.01) | |
| *G06N 3/08* | (2006.01) | |
| *H04L 12/753* | (2013.01) | |

(52) U.S. Cl.
CPC ............ *H04L 63/1425* (2013.01); *G06N 3/02* (2013.01); *G06N 99/005* (2013.01); *H04L 41/16* (2013.01); *H04L 43/0876* (2013.01); *H04L 47/127* (2013.01); *H04L 47/2466* (2013.01); *H04L 47/41* (2013.01); *G06N 3/08* (2013.01); *H04L 45/48* (2013.01)

(58) Field of Classification Search
None
See application file for complete search history.

(56) References Cited

U.S. PATENT DOCUMENTS 6,324,532 B1 * 11/2001 Spence ................ G06K 9/3241
706/19
7,526,806 B2    4/2009 Wiley et al.
(Continued)

FOREIGN PATENT DOCUMENTS

| EP | 2442525 A1 | 4/2012 |
|---|---|---|
| WO | WO-02/48959 A2 | 6/2002 |

OTHER PUBLICATIONS

Sahbi, et al., A Hierarchy of Support Vector Machines for Pattern Detection, Journal of Machine Learning Research, vol. 7, 2006, pp. 2087-2123.*

(Continued)

*Primary Examiner* — Wilbert L Starks
(74) *Attorney, Agent, or Firm* — Parker Ibrahim & Berg LLC; James M. Behmke; Stephen D. LeBarron

(57) ABSTRACT

In one embodiment, network data is received at a first node in a computer network. A low precision machine learning model is used on the network data to detect a network event. A notification is then sent to a second node in the computer network that the network event was detected, to cause the second node to use a high precision machine learning model to validate the detected network event.

18 Claims, 11 Drawing Sheets

(56) References Cited

U.S. PATENT DOCUMENTS

| | | | |
|---|---|---|---|
| 7,603,709 | B2 | 10/2009 | Lewis et al. |
| 7,657,940 | B2 | 2/2010 | Portolani et al. |
| 7,675,926 | B2 | 3/2010 | Olsen et al. |
| 7,694,335 | B1 | 4/2010 | Turner et al. |
| 7,733,798 | B2 | 6/2010 | White et al. |
| 7,779,471 | B2 | 8/2010 | Balasubramaniyan et al. |
| 7,793,138 | B2 | 9/2010 | Rastogi et al. |
| 7,854,000 | B2 | 12/2010 | Venkat et al. |
| 7,971,256 | B2 | 6/2011 | Bhikkaji et al. |
| 8,032,779 | B2 | 10/2011 | Clemm et al. |
| 8,121,024 | B1 | 2/2012 | Natarajan et al. |
| 8,161,554 | B2 | 4/2012 | Sadhasivam et al. |
| 8,230,498 | B2 | 7/2012 | Shaffer et al. |
| 8,261,355 | B2 | 9/2012 | Rayes et al. |
| 8,312,541 | B2 | 11/2012 | Levy-Abegnoli et al. |
| 8,619,576 | B2 | 12/2013 | Vasseur et al. |
| 8,634,316 | B2 | 1/2014 | Rosenberg et al. |
| 2008/0083029 | A1 | 4/2008 | Yeh et al. |
| 2008/0148342 | A1 | 6/2008 | Aiyagari et al. |
| 2011/0258702 | A1 | 10/2011 | Olney et al. |
| 2012/0023572 | A1 | 1/2012 | Williams, Jr. et al. |
| 2012/0026938 | A1 | 2/2012 | Pandey et al. |
| 2012/0155475 | A1 | 6/2012 | Vasseur et al. |
| 2012/0230204 | A1 | 9/2012 | Vasseur et al. |
| 2012/0320923 | A1 | 12/2012 | Vasseur et al. |
| 2013/0010610 | A1 | 1/2013 | Karthikeyan et al. |
| 2013/0024560 | A1 | 1/2013 | Vasseur et al. |
| 2013/0159479 | A1 | 6/2013 | Vasseur |
| 2013/0159548 | A1 | 6/2013 | Vasseur et al. |
| 2013/0179538 | A1 | 7/2013 | Dutta et al. |
| 2013/0219046 | A1 | 8/2013 | Wetterwald et al. |
| 2013/0276114 | A1 | 10/2013 | Friedrichs et al. |
| 2013/0298184 | A1 | 11/2013 | Ermagan et al. |
| 2014/0022906 | A1 | 1/2014 | Vasseur et al. |
| 2014/0025945 | A1 | 1/2014 | McGrew et al. |
| 2014/0222727 | A1* | 8/2014 | Vasseur ............... G06N 99/005 706/12 |

OTHER PUBLICATIONS

Cai, et al., "Distributed Aggregation Algorithms with Load-Balancing for Scalable Grid Resource Monitoring", Parallel and Distributed Processing Symposium, Mar. 2007, 10 pages, Institute of Electical and Electronics Engineers.

Hwang, et al., "DHT-Based Security Infrastructure for Trusted Internet and Grid Computing", International Journal of Critical Infrastructures, vol. 2, No. 4, Nov. 2009, pp. 412-433, lnderscience Publishers.

Jover, R.P., "Security Attacks Against the Availability of LTE Mobility Networks: Overview and Research Directions", 16th International Symposium on Wireless Personal Multimedia Communications (WPMC), Jun. 2013, 9 pages, Atlantic City, NJ.

Lippmann, et al., "Analysis and Results of the 1999 DARPA Off-Line Intrusion Detection Evaluation", Proceedings of the Third International Workshop on Recent Advances in Intrusion Detection, RAID, (2000), pp. 162-182, Springer-Verlag, London, UK.

Oh, et al., "Distributed Learning in Mobile Sensor Networks Using Cross Validation" 49th IEEEE Conference on Decision and Control, Dec. 2010, 6 pages, Institute of Electrical and Electronics Engineers, Atlanta, GA.

Ryan, et al., "Intrusion Detection with Neural Networks", Technical Report WS-97-07, (1997), pp. 72-77, Association for the Advancement of Artificial Intelligence.

Sommer, R., "Outside the Closed World: On Using Machine Learning for Network Intrusion Detection", IEEE Symposium on Security and Privacy, May 2010, pp. 305-316, Intitute of Electrical and Electronics Engineers, Oakland, CA.

Vasseur et al., "Computer Network Anomaly Training and Detection Using Artificial Neural Networks", U.S. Appl. No. 61/923,847, filed Jan. 6, 2014, 166 pgs., U.S. Patent and Trademark Office, Alexandria, Virginia.

Vasseur, et al., "Routing Metrics Used for Path Calculation in Low-Power and Lossy Networks", Request for Comments 6551, Mar. 2012, 30 pages, Internet Engineering Task Force Trust.

Viola, et al. "Rapid Object Detection Using a Boosted Cascade of Simple Features", Proceedings of the 2001 IEEE Computer Vision and Pattern Recognition, vol. 1, (2001), 8 pages, Institute of Electical and Electronics Engineers.

Winter, et al., "RPL: IPv6 Routing Protocol for Low-Power and Lossy Networks", Request for Comments 6550, Mar. 2012, 157 pages, Internet Engineering Task Force Trust.

Zinkevic, et al., "Parallelized Stochastic Gradient Descent", Proceedings of the Advances in Neural Information Processing Systems 23 (2010), 37 pages.

\* cited by examiner

HIERARCHICAL EVENT DETECTION IN A COMPUTER NETWORK

RELATED APPLICATIONS

This application claims priority to U.S. Provisional Application No. 61/923,847, filed Jan. 6, 2014, entitled: COMPUTER NETWORK ANOMALY TRAINING AND DETECTION USING ARTIFICIAL NEURAL NETWORKS, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, and association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML techniques for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
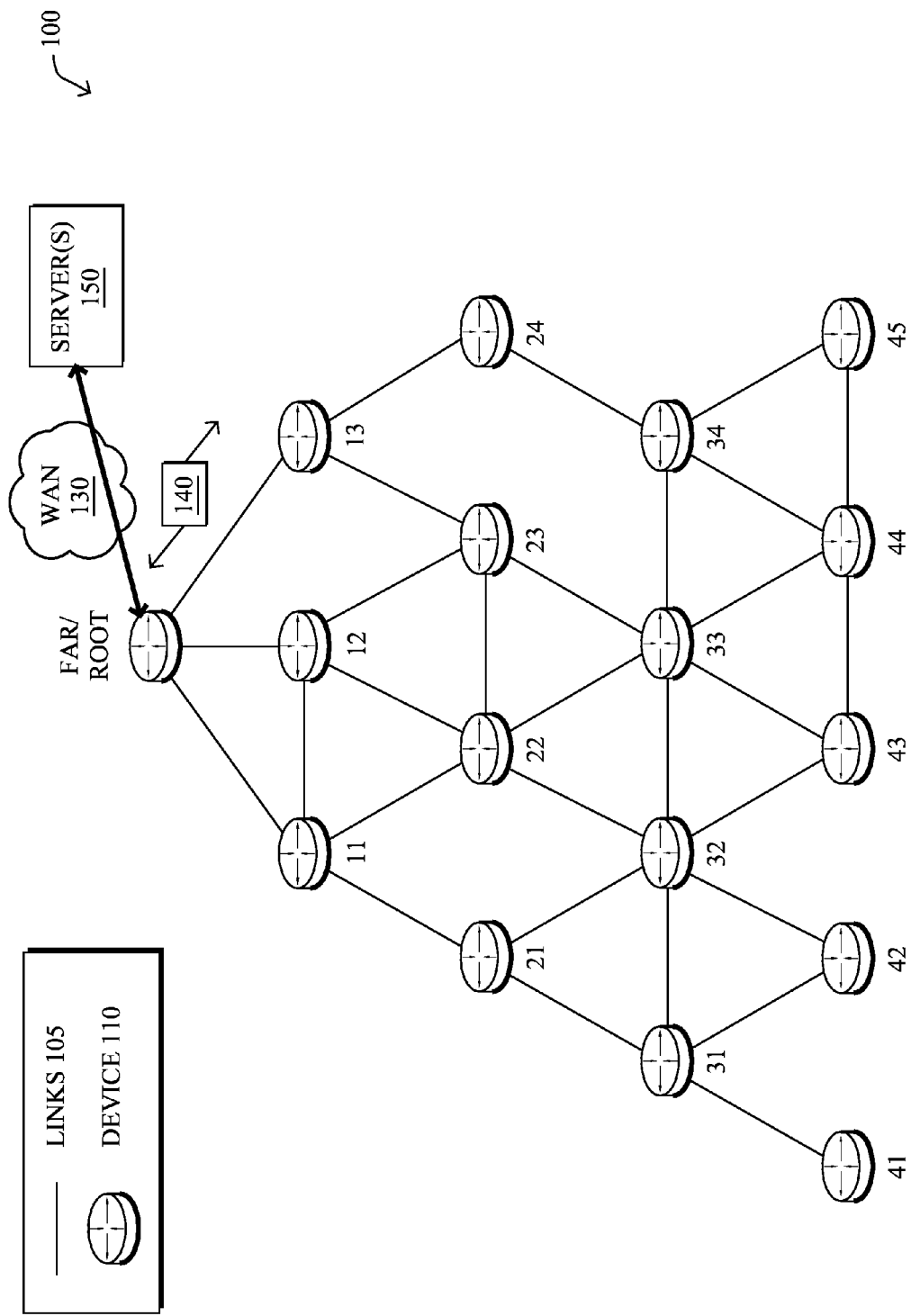
FIG. 1 illustrates an example communication network.

According to one or more embodiments of the disclosure, network data is received at a first node in a computer network. A low precision machine learning model is used on the network data to detect a network event. A notification is then sent to a second node in the computer network that the network event was detected, to cause the second node to use a high precision machine learning model to validate the detected network event.

In various embodiments, a notification is received at a node in a computer network that a network event was detected by another node in the computer network using a low precision machine learning model. Network data used by the other node to detect the network event is also received. The detected network event is then validated using the network data with a high precision machine learning model.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
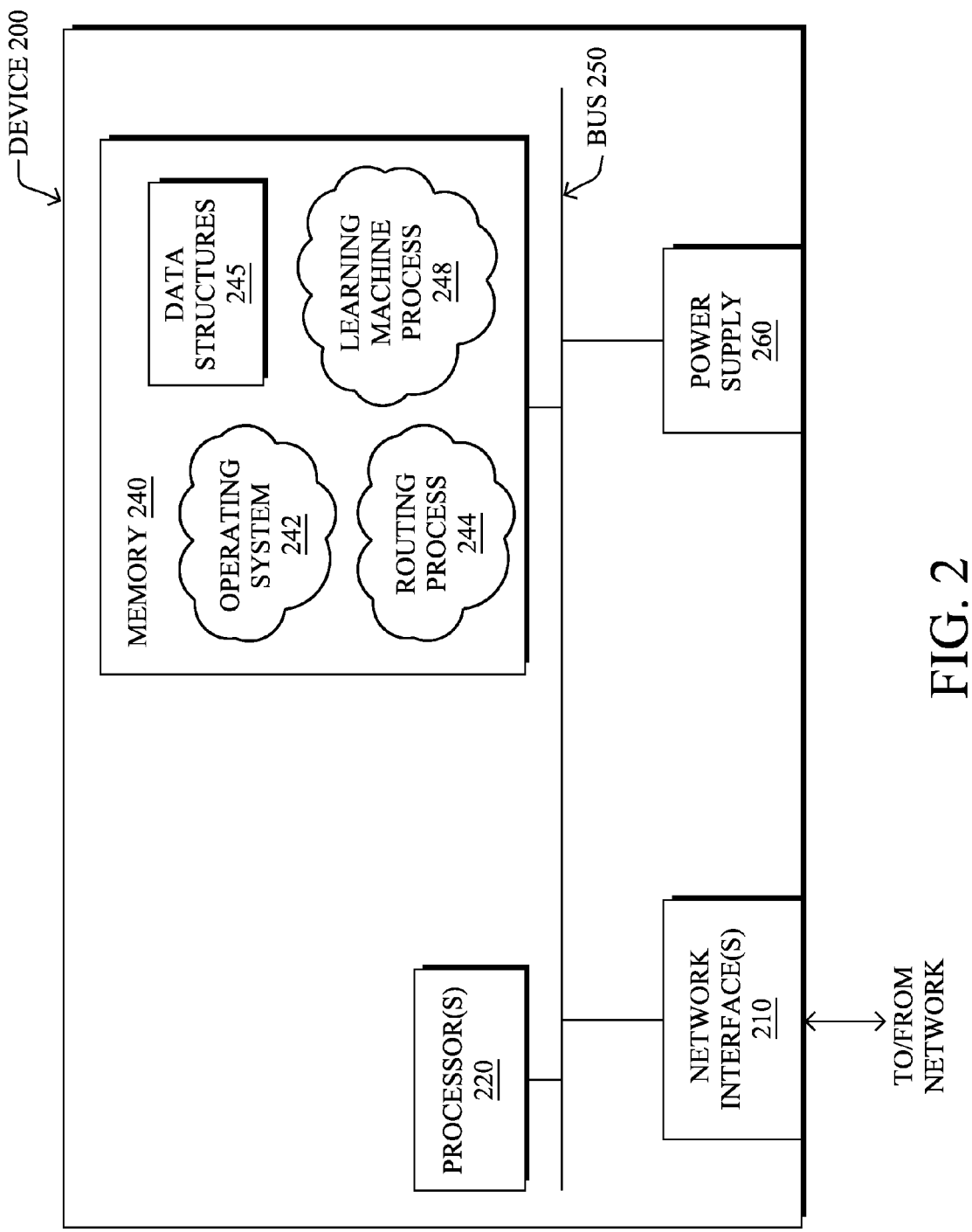
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward, and terminating at, one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
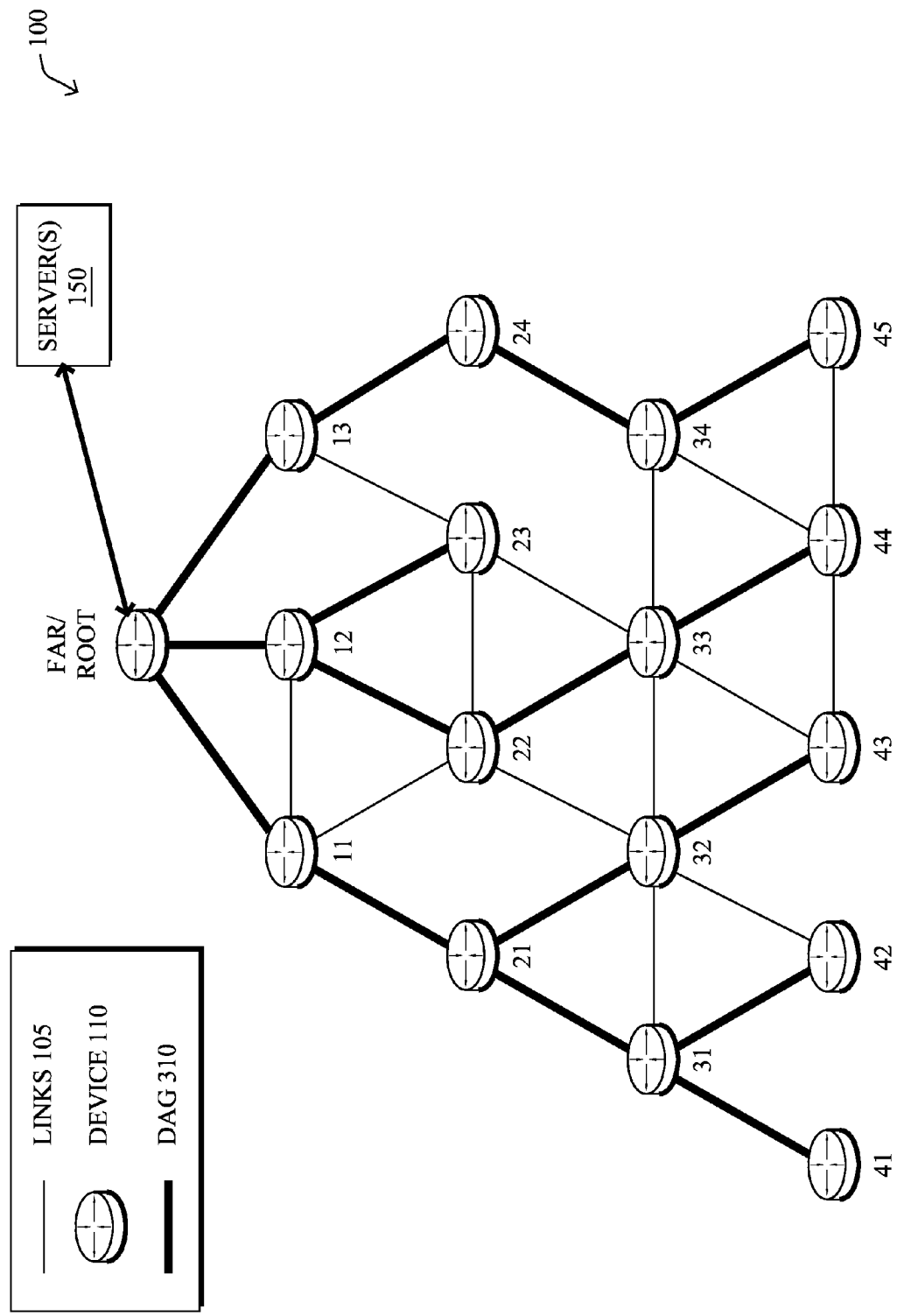
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points.

The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficient management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are a type of machine learning technique whose underlying mathematical models were inspired by the hypothesis that mental activity consists primarily of electrochemical activity between interconnected neurons. ANNs are sets of computational units (neurons) connected by directed weighted links. By combining the operations performed by neurons and the weights applied by their links, ANNs are able to perform highly non-linear operations on their input data.

The interesting aspect of ANNs, though, is not that they can produce highly non-linear outputs of the input. The truly interesting aspect is that ANNs can "learn" to reproduce a predefined behavior through a training process. This capacity of learning has allow the successful application of ANNs to a wide variety of learning problems, such as medical diagnostics, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming at, by any means, making a particular service unavailable (be it a certain application running on a server or network connectivity itself). This is usually performed by bringing the target's resources to exhaustion (again, target resources may range from bandwidth to memory and CPU).

In greater detail, a DoS attack may consist in flooding a target network with hundreds of megabits of traffic (volume based DoS), exhausting a server state by opening a large number of TCP connections (SYN flooding), or by making an HTTP server unavailable by sending it an overwhelming number of requests. An attack may be more subtle and exploit well-known vulnerabilities in the target system (e.g. a large number of fragmented IP packets may exhaust the resources of a router).

Nowadays, DoS attacks are mostly distributed, i.e., they are carried out by multiple sources at the same time, thus making it more difficult to track. In many cases, botnets (i.e. armies or infected hosts spread across the network and under the control of a single master) are used for mounting DoS attacks. In addition, source addresses used for attacks can be spoofed, so that blocking an offending address is potentially useless.

In general, DoS attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things (IoT) represents a completely different scenario and requires novel detection and reaction strategies. Its highly distributed nature implies that there is no central vantage point from which an attack can be observed. In addition, the scarce resources of the IoT force reporting from the nodes to a central location to be reduced to a minimum.

On top of the lack of global information, detecting DoS in the IoT is made harder by the fact that a much more subtle interference of the network's operations may be enough to bring the network down. For example, a jamming node can prevent a node from decoding traffic by just emitting short bursts when activity on the channel is detected. This can isolate a large portion of the network which uses that node as a parent and cut off a large portion of the network. In addition, in the case of battery operated nodes, a slow but steady flow of malicious traffic can exhaust a node's battery, thus making the node useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data that are typical of a known anomalous behavior.

—Possible Attacks Against IoT—

Even though the existing literature regarding possible attack types against the IoT is limited, a number of attacks against sensor network technologies may apply with a few minor modifications. Such attacks can be roughly classified into two classes: 1.) insider attacks (i.e., where the malicious node needs to be authenticated and be in possession of the network encryption keys), and 2.) outsider attacks (i.e., where the attacker just needs to be within the radio range of the victims).

In particular, a number of attacks against routing performed by a malicious node in the DAG can be imagined. A node can, for example, perform selective forwarding. In other words, the node could just discard some of the traffic messages that it is asked to forward, while still participating correctly within the routing protocol. Although this can potentially be revealed by end-to-end mechanisms, detection of this type of attack can be difficult and slow due to the low traffic rate and lossiness of IoT networks. Other example attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming), or attack only a particular type of traffic (selective jamming). The damage from a jamming attack can be maximized if the attacker is able to estimate the centrality of a node in the routing topology. This can be obtained by accounting for the amount of traffic transmitted and received by each node, by leveraging the fact that the link layer addresses are in clear. Once the jammer has detected the most central node, it can try to make this node unreachable for its descendants, which will in turn be forced to select another parent. This can potentially create continuous route oscillations and convergences.

Other kinds of external DoS attacks can be performed by exploiting the fact that a number of messages in the WPAN do not need authentication, such as discovery beacons and some of the EAPoL messages used for authentication. In particular, discovery beacons can be used for injecting false synchronization information into the network, so as to prevent two nodes from meeting on the right unicast communication frequency. EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may to have authentication requests be rate-limited. However this may result in legitimate nodes being prevented from authenticating when an attack is in progress.

Other attacks can be performed against networks that use the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-hopping and synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on and at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), downloading firmware upgrades (e.g. to upgrade AMI meter software to a newer version), and for power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID String

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such a beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

—802.15.4 Security—

Currently, IoT architecture comes with several embedded security mechanisms. The cornerstone of IoT security is indeed link layer encryption, which is mandatory for most frames (including routing messages and application traffic).

Besides pure encryption, link layer security ensures message integrity (through an encrypted MAC code) and message non-replication (through an encrypted sequence number included in the encrypted message payload).

In order to install the necessary link layer keys on every node, an authentication procedure is carried out when the node joins the network. Such a procedure is based on the EAPOL protocol, which is carried directly over layer 2 messages and is used for transporting authentication data from the node to the FAR (notice that such messages are not encrypted). On top of EAPOL, two main protocols are carried: EAP messages, which the FAR tunnels to an AAA server through the RADIUS and 802.11i messages, which are used for exchanging cryptographic material between the FAR and the node.

In greater detail, EAP messages are used by the node for mutual authentication with the AAA server and securely agree on a shared secret; to this end, a complete TLS handshake is, in turn, tunneled over EAP messages and a public key mechanism based on X509 certificates is used for identity validation. Once such shared secret has been established, the AAA server transmits it to the FAR, which, in turn, uses it for exchanging the link layer keys with the node through the 802.11i protocol.

Notice that the shared secret negotiated through EAP is stored by the node in persistent memory and can be reused for subsequent authentication (in this case, EAP is skipped and the link layer key is directly exchanged through 802.11i).

Hierarchical Event Detection in a Computer Network

A common use of ANNs is as classifiers. Generally, a classifier is a learning machine (LM) that takes a sample as input data and computes a label as output. A binary classifier, which is the most common use case, takes the input and labels it as either belonging to the class of interest or not. Thus, multiclass classifiers can also be constructed by combining binary classifiers. Good quality classifiers computed using ANNs, or any other machine learning model, can have very high recall values and a low ratio of False Positives (FP). However, when the amount of samples to classify is huge, even a low ratio of FP can be a problem in a network. In the particular case of using a classifier for monitoring some network parameters, such as attacks against nodes, this problem can be present due to the potentially high number of evaluations of the classifier (e.g., caused by a high number of nodes and a high frequency of arrival of new samples that need to be classified). Thus, strategies may be adopted that allows obtaining good classifiers in terms of precision and recall, even under this context of high number of evaluations.

Furthermore, if one considers the case of highly constrained networks such as LLNs, bandwidth limitations make unfeasible the use of a centralized single classifier for monitoring purposes. Indeed, constantly reporting features to the monitoring point can easily collapse the network. This aspect is fundamental in networks where the bandwidth is non homogenous and where nodes at the very edge of the network are highly constrained. As will be appreciated, a "feature" in the machine learning context generally refers to any observable property, attribute, etc. of an observed phenomenon. Thus, when machine learning is used in a network, a feature may correspond to network data that describes a particular property, attribute, etc. regarding the network.

According to the techniques herein, a distributed and hierarchical classifier approach combining classifiers exhibiting characteristics of different natures is disclosed for monitoring a certain aspect of the network (e.g., detecting the presence of attacks, detecting other network events, etc.). By appropriately distributing classification steps, the techniques herein permit improving the global classification precision while at the same time reducing traffic on the network for monitoring purposes. The techniques herein also consider all the mechanisms for pushing classifiers down to the nodes and pulling advanced features from nodes that launch an alarm up to the router, in order to continue the classification. While the techniques herein are described primarily in the context of the IoT, the techniques herein are also applicable to non-IoT cases (e.g., access links in a remote branch where the router is connected to the central site using low-speed links), since the problems due to the high number of evaluations still apply in many types of networks. Also, while the techniques herein are described primarily with respect to ANN classifiers, it is to be appreciated that the techniques can easily be adapted to classifiers using any other machine learning technique.

Said differently, the techniques herein determine the optimal architecture to distributed classifiers in a network, according to various network parameters (e.g., such as the node attributes, the network characteristics, the overall objectives to detect an event using classifiers such as a DDoS attack, etc.). In particular, the techniques dynamically upload classifiers in nodes according to their computational capabilities (i.e., classifiers are weaker on nodes that are less capable), using a hierarchy whereby weaker/less demanding classifiers are distributed according to nodes' attributes and network bandwidth available. Once a positive value is returned by a classifier to a node hosting a stronger and/or more demanding classifier, that node may request additional information in order to draw a conclusion thanks to a dynamic exchange of information between nodes taking into account the number of positives from weaker classifiers and network states.

Figure 4:
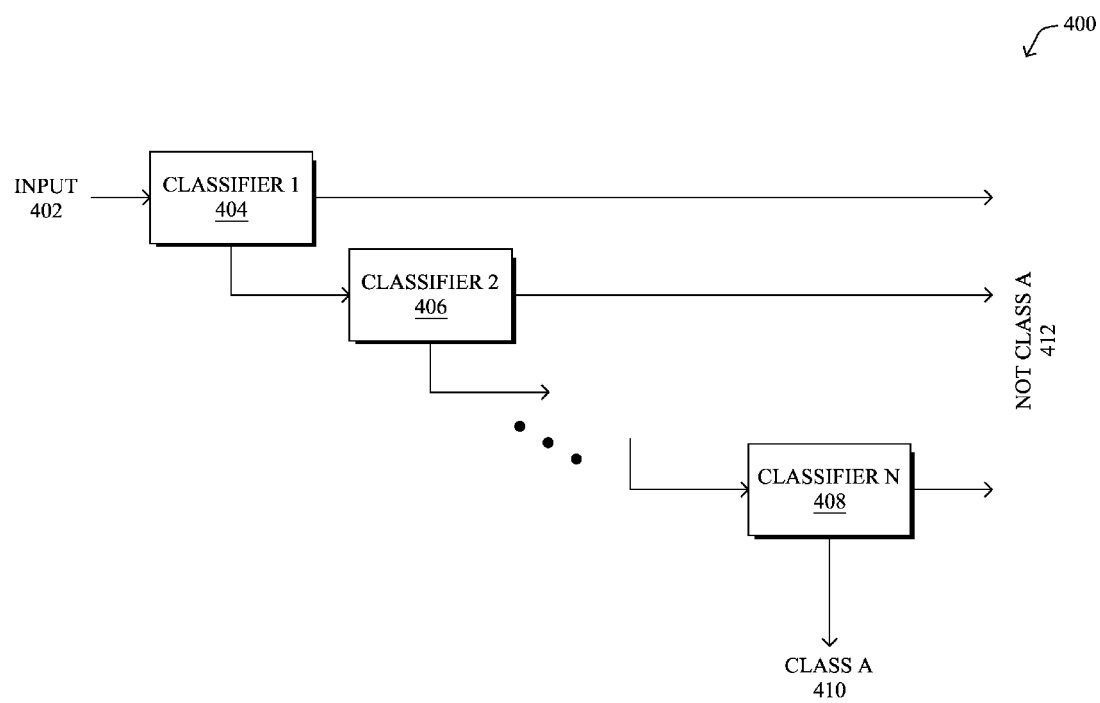
FIG. 4 illustrates an example of cascaded ANN classifiers.

Notably, classifiers are LMs that take a sample as input data and compute a label for this sample as output. An example of a classifier can be a LM that takes certain features about a node as input and outputs 1 if these features correspond to a node that is being attacked, and 0 otherwise. As shown in the example of FIG. 4, to improve the computational requirements and precision of the classifier, cascades of classifiers may be used. In general, a cascade of classifiers is a hierarchical classifier structure where only the last stage can assign a positive label (i.e., the sample belongs to the class of interest), but any stage can assign a negative label (i.e., the sample does not belong to the class of interest). For example, as shown in FIG. 4, a hierarchy of classifiers comprising classifiers 404-408 (e.g., a first through nth classifier) may sequentially evaluate a sample input 402. During the evaluations, any of classifiers 404-408 may generate an output 412 that signifies that input 402 does not belong to a class A. If a particular classifier does not reach this conclusion, processing proceeds to the next classifier to perform its own evaluation. This continues on until the last classifier (e.g., an nth classifier), at which point the classifier may generate an output 410 signifying that input 402 belongs to the class or output 412 signifying that input 402 does not belong to the class. Thus, an input sample that goes into a particular classifier (e.g., the first stage of the classifier) only progresses to the next stage if it has been labeled as positive (i.e., as belonging to the class of interest), by the classifier in the current stage. This way, a positively labeled sample has been labeled as belonging to the class of interest in all the stages of the cascade, while a sample negatively labeled has been labeled as such in only one stage and then its propagation to the following stages (and therefore the computation) has been stopped there. This kind of cascade may be implemented using classifiers with a very high recall value (i.e., having few False Negatives) and with precision values that increase from one stage to the next. High recall values are usually easier to achieve than high precision values (i.e., few False Positives), and high values of recall and precision simultaneously are very related to the complexity and computational requirements of a classifier. Then, by combining classifiers with these characteristics in a cascade structure, a global classifier computationally more efficient and with better precision and recall scores than any of the classifiers in the stages is obtained.

The techniques described below use cascades of classifiers in a physically distributed way on a LLN. This approach presents two main advantages with respect to the use of a standard, centralized cascade of classifiers. First, by physically distributing the stages of the classifier, the computational requirements are also distributed on the network. In particular, nodes with limited computational resources can perform the first stages of the cascade of classifiers, thereby reducing the computational requirements of the entity that will perform the last stage(s) of the whole classifier. Second, by computing the first stages of the classifier directly on the network nodes, a high number of samples are already discarded and therefore not further propagated on the cascade. This means that a high number of samples do not need further classification and therefore their features do not need to be propagated to the next stages, which reduces the amount of traffic required for the classification of a sample.

Operationally, as noted above, the techniques herein introduce a hierarchical classifier technique for distributed networks using cascades of classifiers. The considered cascade generally includes at least two stages: a first stage that is in a node or directly on the Router and a second evaluated on the Router. The objective of this hierarchical application of classifiers is double. On the one hand, the sequential application of classifiers, if designed correctly, reduces the number of FPs. On the other hand, pushing the first step to the node reduces the amount of information that has to be reported to the Router, since some samples can already be discarded locally on the node. It is worth reminding that in many circumstances, such as the use of classifiers computed by ANNs to detect DoS attacks, feeding an ANN hosted on a router (e.g., a FAR) with a massive amount of information makes such an approach ill-suited to LLN applications. Indeed, in a highly multi-dimensional space, the ANN may require a number of data points as input that would simply congest the network if communicated between devices. Note, however, that if the node cannot perform the first step of classification locally due to a lack of computational resources (e.g., temporary CPU congestion on the node) or another reason, the techniques herein also consider the possibility of computing everything on the Router itself.

Specifically, according to various embodiments, network data is received at a first node in a computer network. A low precision machine learning model is used on the network data to detect a network event. A notification is then sent to a second node in the computer network that the network event was detected, to cause the second node to use a high precision machine learning model to validate the detected network event.

According to some embodiments herein, a low precision machine learning model may be characterized as being less computationally demanding (i.e., allowing the model to be run on a low-end device), with a higher performance detection rate and potentially a high rate of false positive. In contrast, a high precision model may be characterized as being more computationally demanding (e.g., requiring the model to be run on a higher-end device), with a high performance detection rate and a low rate of false positive.

As used herein, the term "router" is used in a generic fashion and can be a ruggedized router also known as a Field Area Router (FAR) or a non-ruggedized router or a switch (i.e., that performs bridging as opposed to routing at layer-3). Note also that although the techniques herein are described primarily in the context of ANN classifiers, the techniques apply to any kind of classifier that can be constructed following the precision and recall requirements for cascades of classifiers. For instance, Support Vector Machines (SVMs) are also very well suited for cascades of classifiers and may be used, in further embodiments.

In some embodiments, a first component of the techniques herein defines a classification in two steps using a distributed classifier. Illustratively, a classifier called the Weak Classifier (WC) performs the first step, and a classifier called the Strong Classifier (SC) performs the second step.

The WC may be implemented using an ANN or other learning machine that has to satisfy the following requirements:
 High recall score, in order not to discard samples that should be forwarded to the SC for further inspection. In other words, the WC should have a low False Negative rate (e.g., the WC should not classify as negative what is indeed a DDoS attack).
 Low computational requirements, for being suitable for highly constrained devices.

In general, False Positives (FPs) are acceptable when using the cascading classifiers herein, whereas False Negative (FNs) are generally not acceptable.

The SC is also implemented using an ANN or other learning machine. However, in this case the classifier can be computationally more expensive, given that it is expected to have high recall and precision scores.

The input features for the WC and the SC are also not necessarily the same. Indeed, the WC being a low performance classifier (e.g., in terms of precision) can have less elaborated features as input. The SC, in contrast, being a high performance classifier in terms of precision and recall, can have more complex input features than the WC. For instance, a SC classifier can consider some principal components of a subset of features as input, while the WC may consider feature values directly as input.

The design of the weak and strong classifiers herein may take into account the characteristics of the device where they will be used. In other words, the classifier may be adapted to the computational resources of the device. For instance, in the case of ANNs, the activation functions and the number of neurons should be adapted to these computational constraints in the sense that both the evaluation of the activation function and the number of these evaluations have to be feasible under the specified constraints. Furthermore, these characteristics can be considered also as input features for the classifier, since they can provide important information for the classification. For example, the power of emission of a device can have a main role on the achieved transmission success rate, and this information can be useful when trying to distinguish between normal physical conditions and physical conditions disturbed by an attacker.

Although the techniques herein describe the use of two types of classifiers (i.e., strong and weak classifiers), the techniques may be generalized to the case of n number of classifiers, in various embodiments. Indeed, in a multi-layer network, with m layers (e.g., very edge, Field Area Network, Core network, Data center), the techniques herein may be implemented by using n<m classifiers with different level of performance according to the computing resources, available bandwidth in the network.

In the general case, the following terms are specified:
A Classifier CL(n) is a classifier computed by a Learning Machine that will be used at layer n in the network.
P(CL(n)) is the performance of the classifier used at layer n.
C(CL(n)) is the complexity of CL(n) (e.g., the amount of CPU resources required).
B(CL(n)) is the amount of bandwidth or network resources required by CL(n) to perform.
FP(CL(n)) False Positive Rate.
FN(CL(n)) False Negative Rate.
Properties of the classifiers:
If n<m, then
P(CL(n))<P(CL(m)). In other words, a classifier at layer 1 (i.e., the very edge) is less efficient than a classifier at layer>1.
FP(CL(n))>FP(CL(m)).
C(CL(n))<C(CL(m)).
B(CL(n))<B(CL(m)).

The second component of the techniques herein introduces a mechanism for selecting and pushing a classifier from a node at layer n to a node at Layer m where n>m.

In the context of ANN classifiers, the elements that may be pushed to the node in order to perform the required classification are:
The Activation Function evaluated by neurons.
The weights of all the links in the ANN.
The threshold applied to the output for positively labeling a sample. Indeed, classification is usually performed by providing a binary 0 or 1 label, but the output of a classifier is typically continuous between the values of 0-1. Therefore, a threshold for considering an output as either a 0 or a 1 may be used. Notably, the precision and recall of a classifier can be modified by modifying this threshold.

In the rest of this illustrative description, the case of N=2 layers is described in the context of an LLN where, at the lowest layer, nodes are highly constrained (e.g., at Smart Meters) and the next layer is the Field Area Router. In such a case, CL(1) is the WC and CL(2) is the SC. For pushing these elements to a node, the FAR must first perform a selection of the node capable of using a WC. In one embodiment, such a selection is performed by the FAR thanks to the discovery of the node attributes, such as reported via a routing extension included within the SNA object and carried itself in the DAG Metric container object. In another embodiment, the FAR may send a newly defined unicast IP message such as a CoAP message to query to the node for either obtaining its computational characteristics (e.g., and to locally determine whether the node is capable of making use of the WC) or request the node to make use of a WC (e.g., in which case this is the remote node itself that determines whether or not it can host the WC). In yet another embodiment, other network parameters may be taken into account such as the occurrence of a DDoS attack in the past, the level of congestion in the network in the area where the node lies, and any other policy related parameters.

If the Router considers that the node can perform the first step of the classification or if the node provides a positive reply, the WC may be downloaded on the node using a newly defined Classifier Push (CP) message. Indeed the information about the ANN commented above (e.g., activation function, weights, and threshold) is pushed to the node using this CP message.

If the node cannot perform the required classification, a Features Request (FR) message is sent from the Router to the node for retrieving the features that are not available directly on the Router but that are required for computing the SC. In this case, the node answers with a Features Message (FM) where the values of the requested features are reported.

In another embodiment, a Feature Export Request (FER) message is sent by the router. Such message configures the node so that it will automatically export a FM containing the requested features. A FER message will specify how the export of the requested features will be triggered: an export period can be configured (so that features can be batched together for efficiency reasons) or data can be exported as soon as it is available (in case detection delay is critical).

Figure 5A:
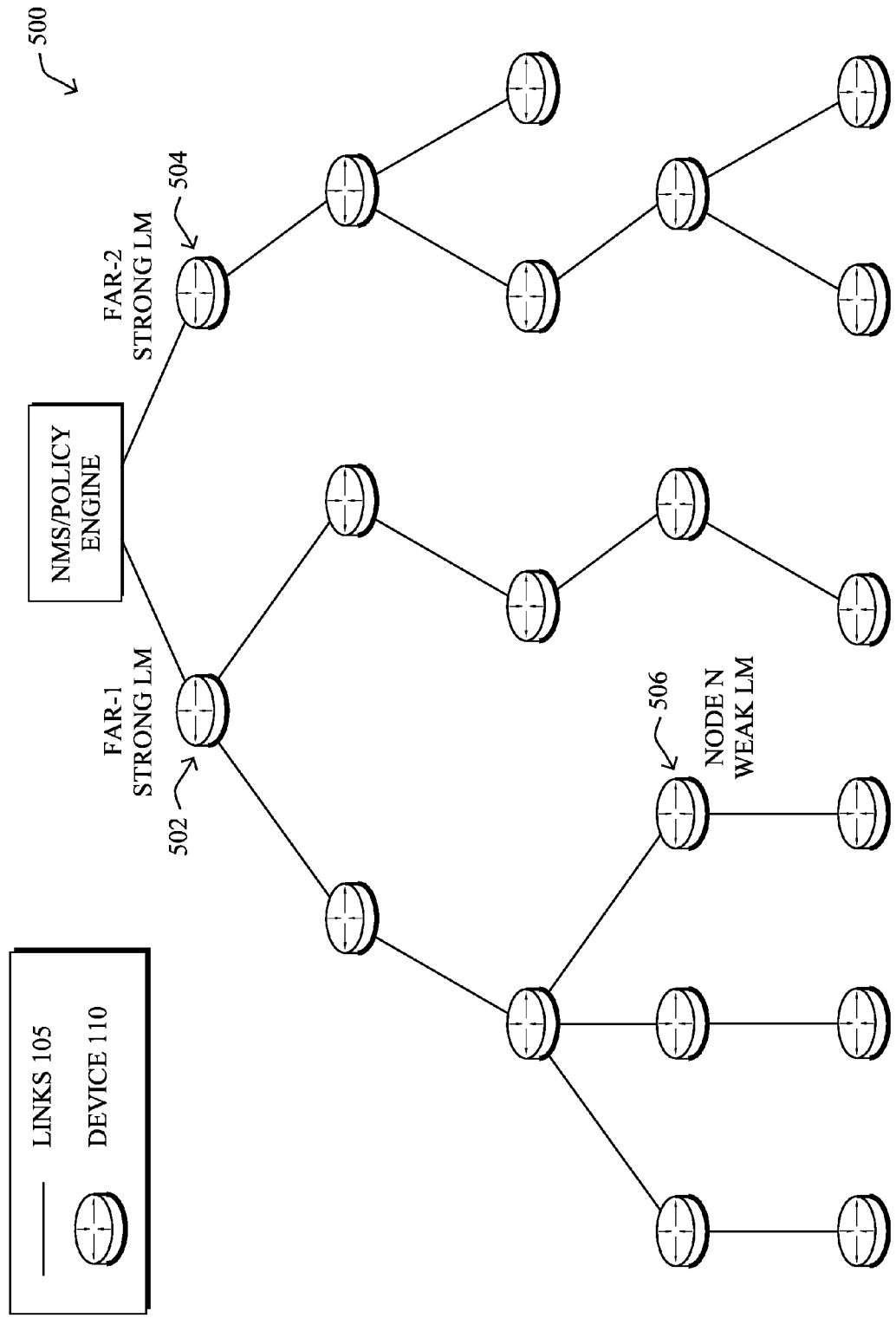
FIGS. 5A-5F illustrate an example of different learning machines being used to detect a network attack.
Figure 5B:
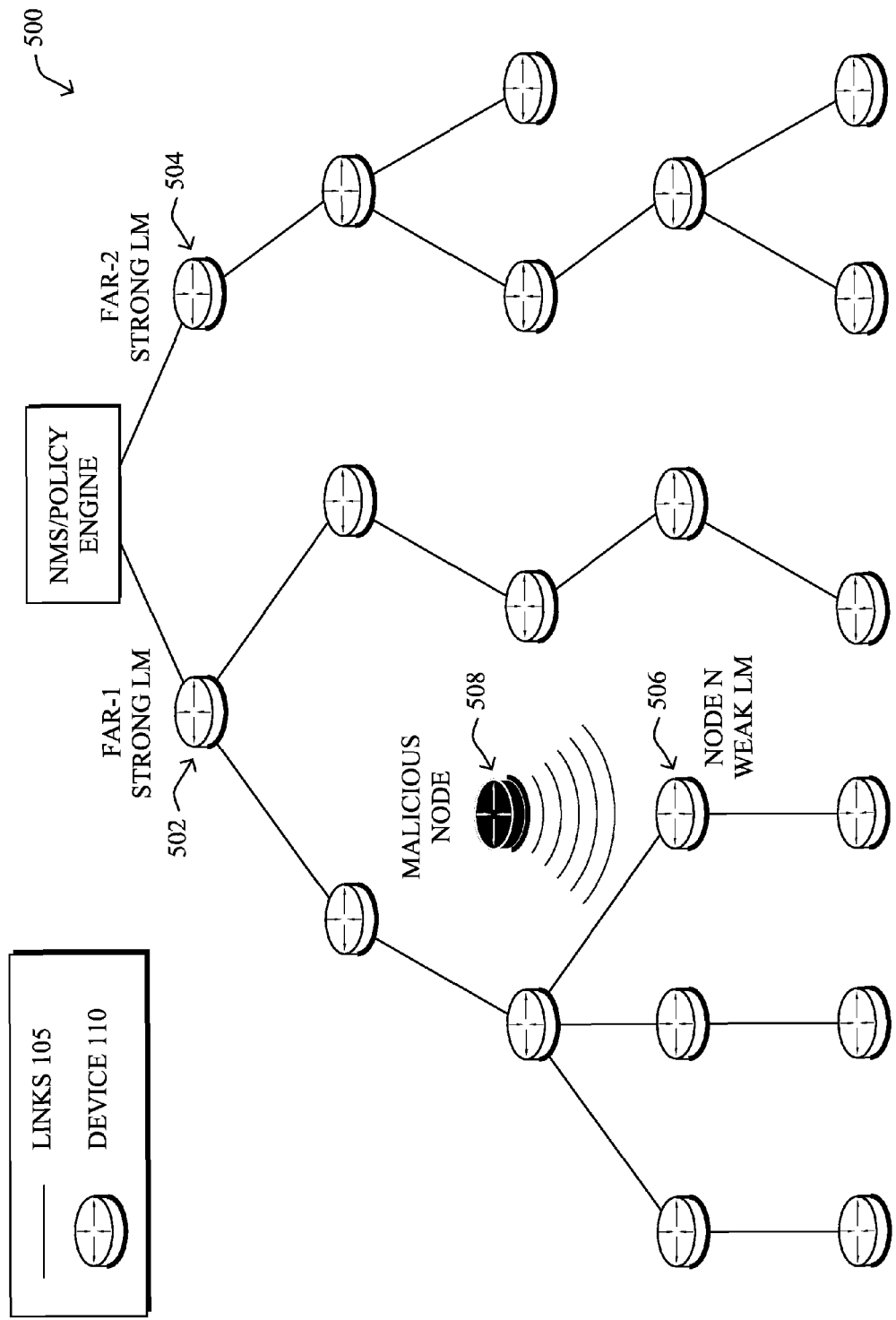

In a third component of the techniques herein, a mechanism is introduced for establishing a communication between the node and the Router when a sample is positively labeled in the node, as illustrated in the example of FIGS. 5A-5F. During this communication, the node has to notify to the Router that a sample has been positively labeled and, therefore, that further inspection should be performed. Once this is acknowledged by the Router, the Router has to communicate to the node which features should be reported in order to continue with the inspection. Note that the notification step is not necessary when the WC has been evaluated by the Router. For example, assume that a network includes a number of nodes 506 that have weak LMs installed, as shown in FIG. 5A. In FIG. 5B, a malicious attack is detected from an attack node 508 at one of the nodes executing a weak classifier.

Figure 5C:
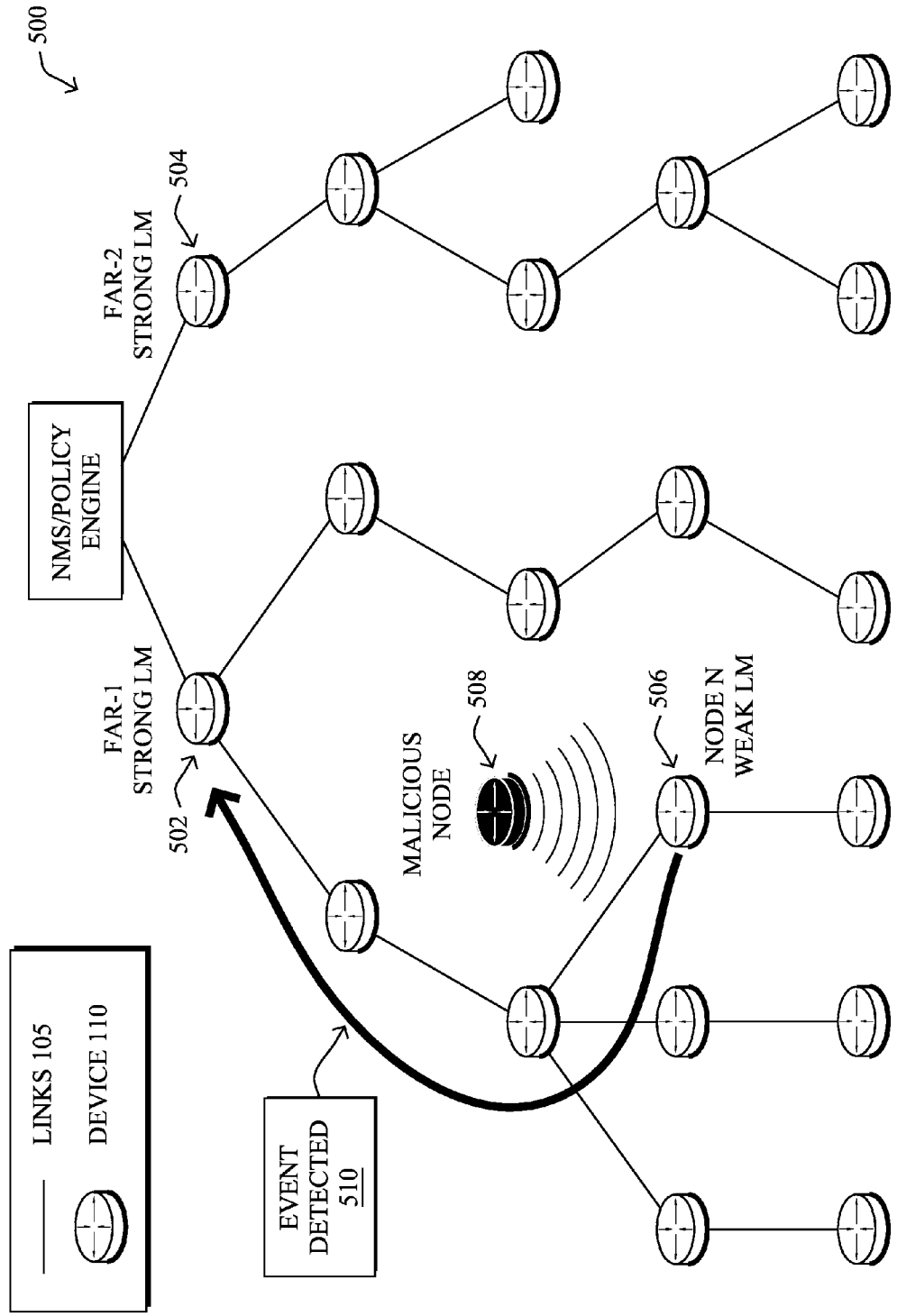

The working flow of the third component of the techniques herein is as follows:

Step 1:
After positively labeling a sample, the node sends a novel IP unicast message called Sample Labeled (SL) message with the features F that were positively labeled. For example, as shown in FIG. 5C, the node that detected an attack via a weak classifier may send an event detected message 510 to its FAR 502.

Step 2:
The router SC may simply to ignore the notification according to policy, or wait to receive N number of notifications from nodes hosting WCs during a period of time T, before proceeding to step 3. Conversely, the node can be configured in order to export only one in N positive-label features.

Figure 5D:
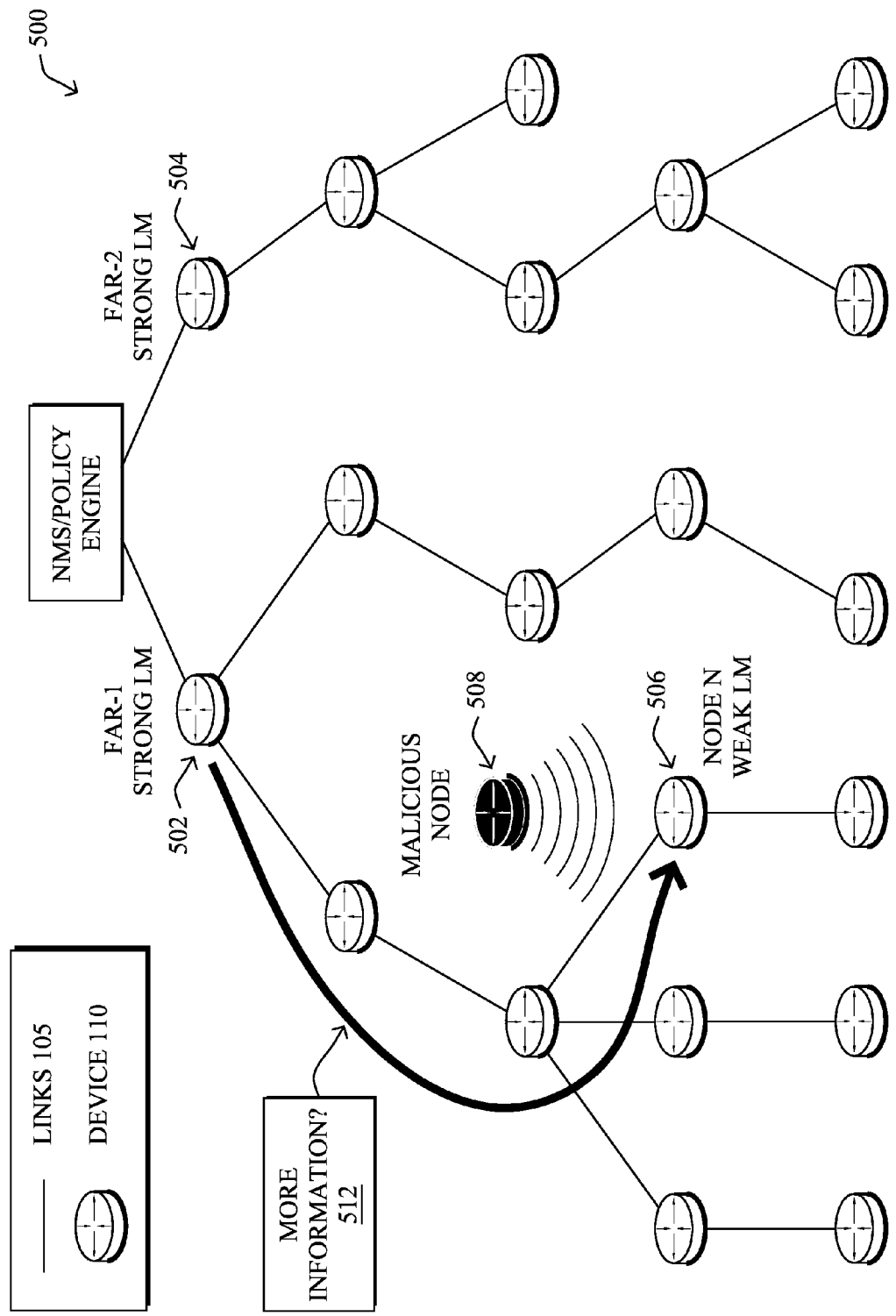
Figure 5E:
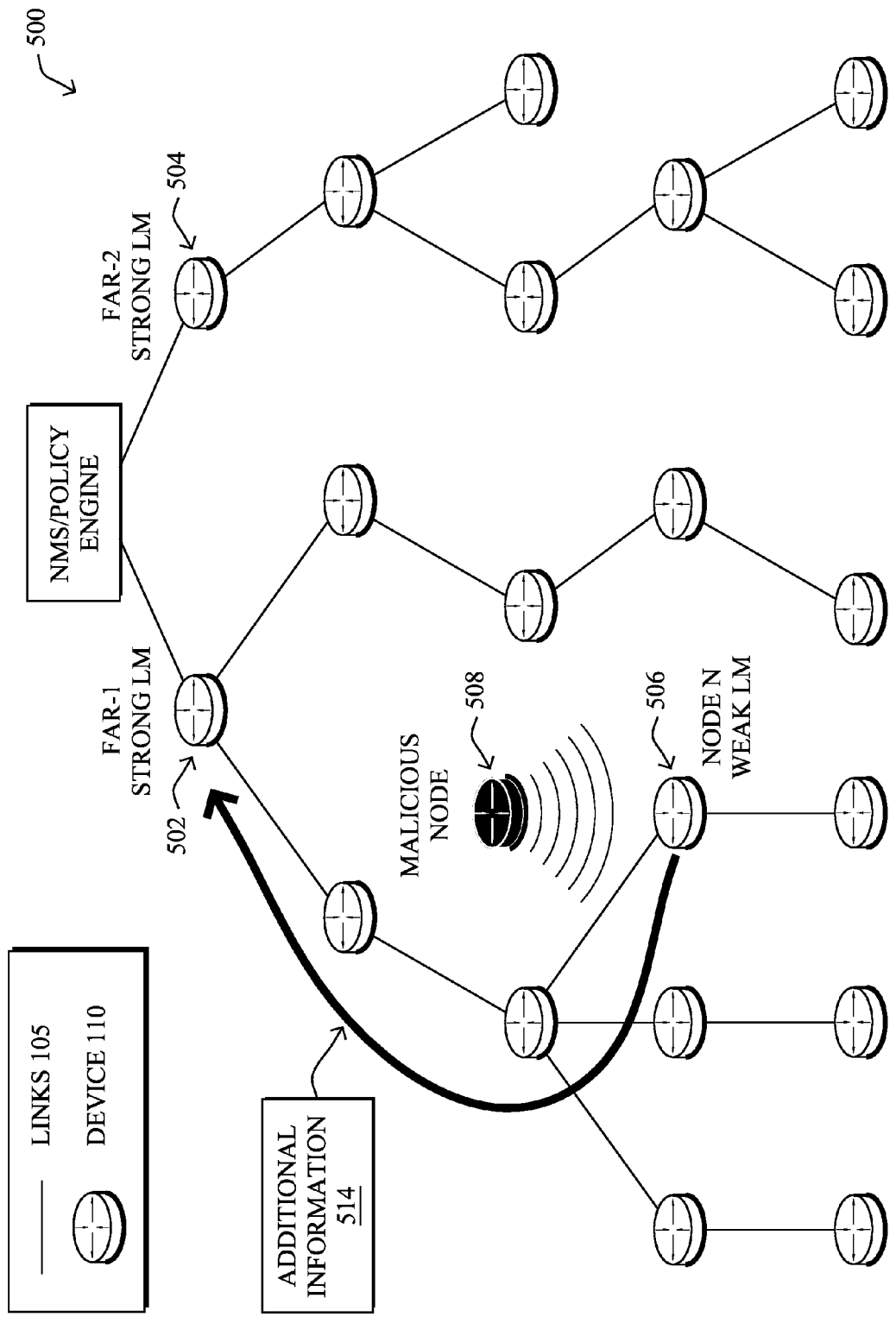

Step-3:
the Router performs an advanced inspection of features using the SC. If extra features from the node are required for evaluating the SC, the Router sends a FR message to the node, with the information about the features that the node has to communicate to the Router. For example, as shown in FIG. 5D, FAR 502 may send a request 512 to the detecting node 506 for more information. Note that the router may, in one embodiment, decide to request such additional features after the expiration of a timer T1 configured according to a policy or the network state. For example, if the DDoS attack detected using that classifier is critical, the router may request the additional information immediately while, on the other hand, the router may delay the request for additional features if the DDoS attack is not so likely and/or not too critical and the network is currently congested. As shown in FIG. 5E, the node 506 provides the features used to detect the attack with the weak classifier to the FAR 502 via a message 514.

Figure 5F:
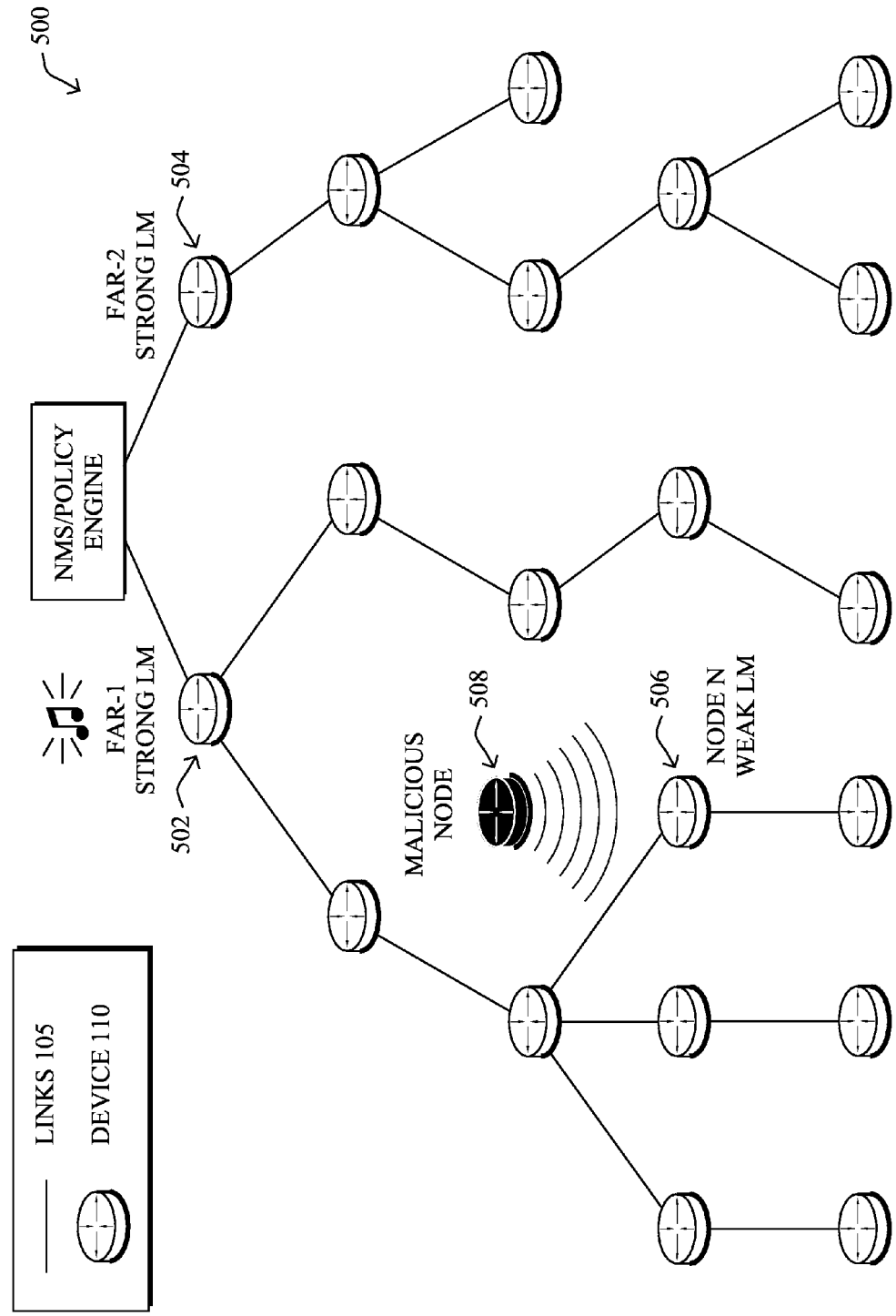

Step 4:

Once the required additional features/information have been received by the Router, it performs the second step of the classification (i.e., the second stage of the cascade). For example, as shown in FIG. 5F, the FAR 502 may use the additional feature data and its own strong classifier to validate whether a network attack actually exists. As the final classifier in the cascade, FAR 502 may determine that the attack is actually present and raise an alarm or may determine that the detected attack is a false positive.

Figure 6:
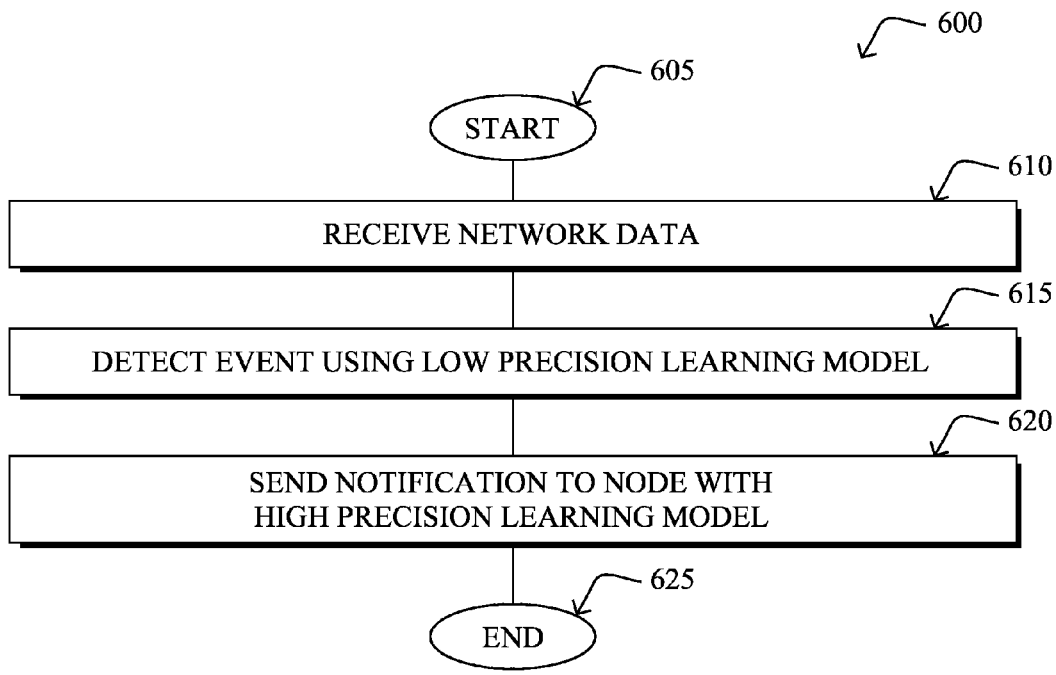
FIG. 6 illustrates an example simplified procedure for using a low precision learning model to detect a network event.

FIG. 6 illustrates an example simplified procedure for using a low precision learning model to detect a network event. Procedure 600 starts at step 605 and continues on to step 610 where, as highlighted above, network data is received by a node/device. In general, the received network data may be any information regarding the state or condition of the network or a portion thereof. In step 615, a low precision learning model, such as an ANN classifier, is used with the network data to detect the presence of a network event. For example, a node/device in the network may use a low precision classifier to determine that a possible network attack is present in the network. At step 620, a notification is sent to another node/device having a higher precision learning model (e.g., ANN classifier) to validate the detected event, and procedure 600 ends at step 625.

Figure 7:
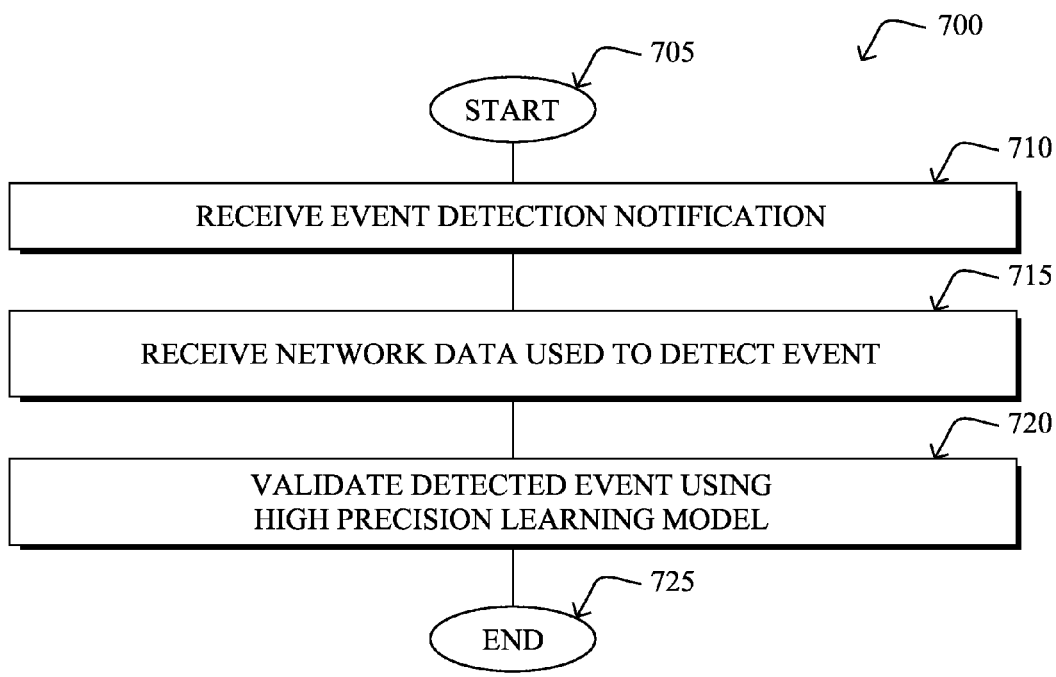
FIG. 7 illustrates an example simplified procedure for validating a detected network event using a high precision learning model.

FIG. 7 illustrates an example simplified procedure for validating a detected network event using a high precision learning model. Procedure 700 begins at step 705 and continues on to step 710 where, as detailed above, an event detection notification is received. For example, an event detection notification may be received from a lower precision classifier. In step 715, the network data used to detect the event is received. As highlighted above, for example, the evaluating node/device may request the network data from the detecting device or at least a portion of the network data may be included in the event detection notification. In step 720, as detailed above, the device may validate the detected event by applying a high precision learning model to the received network data, and process 700 ends at step 725.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for use of a hierarchical classifier, such as those computed by ANNs, in highly constrained networks. In particular, without these techniques, it may be nearly impossible to host classifiers in a network. In particular, some classifiers are too CPU intensive for use in a highly constrained network, leading to unacceptable processing time or even impacting the ability for a node/router to perform other task. Thanks to these described techniques, however, classifiers of various performances are distributed in the network according to the network characteristics and node attributes in a distributed fashion, thus providing a very effective cascade of classifiers adapted to the network characteristics.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for computer network anomaly training and detection using artificial neural networks, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving network data at a first node in a computer network;
   using a low precision machine learning model on the network data to detect a network event; and
   sending a notification to a second node in the computer network that the network event was detected, the notification to cause the second node to use a high precision machine learning model to validate the detected network event, wherein the second node is a field area router (FAR).

2. The method as in claim 1, wherein the first node has lower computing resources than the second node.

3. The method as in claim 1, wherein the machine learning models are artificial neural network (ANNs).

4. The method as in claim 1, further comprising:
receiving, from the second node, a request for information regarding the detected network event; and
sending the requested information regarding the detected network event to the second node.

5. The method as in claim 1, wherein the notification sent to the second node comprises the network data used to detect the network event.

6. The method as in claim 1, further comprising:
receiving a request for computational resources available at the first node from the second node;
providing the available computational resources to the second node; and
receiving the low precision machine learning model from the second node based on the computational resources available at the first node.

7. The method as in claim 1, further comprising:
receiving an eligibility request from the second node;
determining whether the first node is eligible to execute the low precision machine learning model based on computational resources available at the first node;
notifying the second node that the first node is eligible to execute the low precision machine learning model; and
receiving, from the second node, the low precision machine learning model.

8. The method as in claim 1, wherein the second node determines the network event detected by the first node to be a false positive using the high precision machine learning model.

9. An apparatus, comprising:
one or more network interfaces to communicate in a computer network;
a processor coupled to the network interfaces and configured to execute one or more processes; and
a memory configured to store a process executable by the processor, the process when executed operable to:
receive network data in the computer network;
use a low precision machine learning model on the network data to detect a network event; and
send a notification to another node in the computer network that the network event was detected, the notification to cause the other node to use a high precision machine learning model to validate the detected network event, wherein the other node is a field area router (FAR).

10. The apparatus as in claim 9, wherein the machine learning models are artificial neural network (ANNs).

11. The apparatus as in claim 9, wherein the process when executed is further operable to:
receive, from the other node, a request for information regarding the detected network event; and
send the requested information regarding the detected network event to the other node.

12. The apparatus as in claim 9, wherein the process when executed is further operable to:
receive a request for computational resources available at the apparatus from the other node; provide the available computational resources to the other node; and
receive the low precision machine learning model from the other node based on the available computational resources.

13. The apparatus as in claim 9, wherein the process when executed is further operable to:
receive an eligibility request from the second node;
determine whether the first node is eligible to execute the low precision machine learning model based on computational resources available at the first node;
notify the second node that the first node is eligible to execute the low precision machine learning model; and
receive, from the second node, the low precision machine learning model.

14. A method, comprising:
receiving, at a node in a computer network, a notification that a network event was detected by another node in the computer network using a low precision machine learning model;
receiving network data used by the other node to detect the network event;
validating the detected network event using the network data with a high precision machine learning model; and
determining that the network event detected by the other node using the low precision machine learning model was a false positive.

15. The method as in claim 14, further comprising:
requesting, from the other node, data regarding computing resources available at the other node;
determining that the other node is eligible to execute the low precision machine learning model; and
sending the low precision machine learning model to the other node.

16. The method as in claim 14, further comprising:
determining that a particular node cannot execute the low precision machine learning model;
requesting network data from the particular node;
receiving the requested network data from the particular node;
using the network data received from the particular node to detect the network event.

17. The method as in claim 14, wherein the network event is validated in response to receiving notifications that the network event was detected by a plurality of network nodes using low precision machine learning models.

18. An apparatus, comprising:
one or more network interfaces to communicate in a computer network;
a processor coupled to the network interfaces and adapted to execute one or more processes; and
a memory configured to store a process executable by the processor, the process when executed operable to:
receive a notification that a network event was detected by another node in the computer network using a low precision machine learning model;
receive network data used by the other node to detect the network event; and
validate the detected network event using the network data with a high precision machine learning model; and
determine that the network event detected by the other node using the low precision machine learning model was a false positive.

* * * * *